(12) United States Patent
Champagne et al.

(10) Patent No.: US 9,712,261 B2
(45) Date of Patent: Jul. 18, 2017

(54) APPARATUS AND METHOD OF BACKGROUND TEMPERATURE CALIBRATION

(71) Applicant: Silicon Laboratories Inc., Austin, TX (US)

(72) Inventors: Gerald Champagne, Buda, TX (US); David Shen, Saratoga, CA (US)

(73) Assignee: Silicon Laboratories Inc., Austin, TX (US)

( * ) Notice: Subject to any disclaimer, the term of this patent is extended or adjusted under 35 U.S.C. 154(b) by 920 days.

(21) Appl. No.: 13/967,769

(22) Filed: Aug. 15, 2013

(65) Prior Publication Data

US 2015/0048878 A1   Feb. 19, 2015

(51) Int. Cl.
G01K 15/00 (2006.01)
G01K 19/00 (2006.01)
H04B 17/21 (2015.01)

(52) U.S. Cl.
CPC .................................. H04B 17/21 (2015.01)

(58) Field of Classification Search
None
See application file for complete search history.

(56) References Cited

U.S. PATENT DOCUMENTS

| | | | |
|---|---|---|---|
| 5,192,919 A | 3/1993 | Wieczorek | |
| 6,256,483 B1 | 7/2001 | Moerder et al. | |
| 6,448,815 B1 | 9/2002 | Talbot et al. | |
| 6,980,020 B2 | 12/2005 | Best et al. | |
| 7,305,037 B2 | 12/2007 | Josefsson et al. | |
| 7,693,491 B2 | 4/2010 | Pan | |
| 8,348,505 B2 | 1/2013 | Nguyen Hoang et al. | |
| 2007/0018699 A1* | 1/2007 | Abbasi | H02M 3/07 327/156 |
| 2007/0040605 A1 | 2/2007 | Fan et al. | |
| 2011/0150028 A1* | 6/2011 | Nguyen Hoang | G01K 7/01 374/1 |

OTHER PUBLICATIONS

Erdogan, Ozan E.; Hurst, Paul J.; and Lewis, Stephen H., "A 12-b Digital-Background-Calibrated Algorithmic ADC with -90-dB THD", IEEE Journal of Solid State Circuits, Dec. 1999, pp. 1812-1820, vol. 34, No. 12.

Moon, Un-Ku; and Song, Bang-Sup, "Background Digital Calibration Techniques for Pipelined ADC's", IEEE Transactions on Circuits and Systems—II: Analog and Digital Signal Processing, Feb. 1997, pp. 102-109, vol. 44, No. 2.

(Continued)

*Primary Examiner* — Erica Lin
(74) *Attorney, Agent, or Firm* — Cesari & Reed LLP; R. Michael Reed

(57) ABSTRACT

A circuit includes a controller configured to determine a calibration state of a circuit, to determine an active mode state of the circuit, and to select a type of calibration operation based on the calibration state. The controller is configured to control timing of the selected type of calibration operation in response to determining the calibration state to correspond to a time when the circuit is not active.

20 Claims, 6 Drawing Sheets

(56) References Cited

OTHER PUBLICATIONS

Li, Jipeng; and Moon, Un-Ku, "Background Calibration Techniques for Multistage Pipelined ADCs With Digital Redundancy", IEEE Transactions on Circuits and Systems—II: Analog and Digital Signal Processing, Sep. 2003, pp. 531-538, vol. 50, No. 9.
Wang, Xiaoyue; Hurst, Paul J.; and Lewis, Stephen H., "A 12-bit 20-Msample/s pipelined analog-to-digital converter with nested digital background calibration." IEEE Journal of Solid-State Circuits, vol. 39, No. 11 (2004): pp. 1799-1808 (reprinted as pp. 1-41).
Liu, Hung-Chin; Lee, Zwei-Mei; and Wu, Jieh-Tsorng, "A 15-b 40-MS/s CMOS Pipelined Analog-to-Digital Converter With Digital Background Calibration", IEEE Journal of Solid-State Circuits, May 2005, pp. 1047-1056, vol. 40, No. 5.

* cited by examiner

APPARATUS AND METHOD OF BACKGROUND TEMPERATURE CALIBRATION

FIELD

The present disclosure is generally related to temperature calibration of a circuit, and more particularly, to background temperature calibration.

BACKGROUND

Circuits that include transmitters and/or receivers may utilize calibration for transmission and for decoding a received signal. Calibration is commonly performed during manufacturing or on initial device power-up. However, temperature variation during operation may impact circuit performance.

SUMMARY

In an embodiment, a circuit includes a controller configured to determine a calibration state of a circuit, to determine an active mode state of the circuit, and to select a type of calibration operation based on the calibration state. The controller is configured to control timing of the selected type of calibration operation in response to determining the calibration state to correspond to a time when the circuit is not active.

In another embodiment, a method of background calibration of a circuit includes determining a calibration state of a circuit and selecting a type of calibration from a plurality of calibration types based on the calibration state. The method further includes performing the selected type of calibration when the circuit is not actively transmitting an output signal or receiving an input signal.

In still another embodiment, a circuit includes a transceiver circuit and a controller coupled to the transceiver circuit. The controller is configured to determine an active mode state of the transceiver circuit, to select one or more calibration operations in response to determining the calibration state, and to dynamically schedule performance of the one or more calibration operations for a time when the transceiver circuit is not active.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
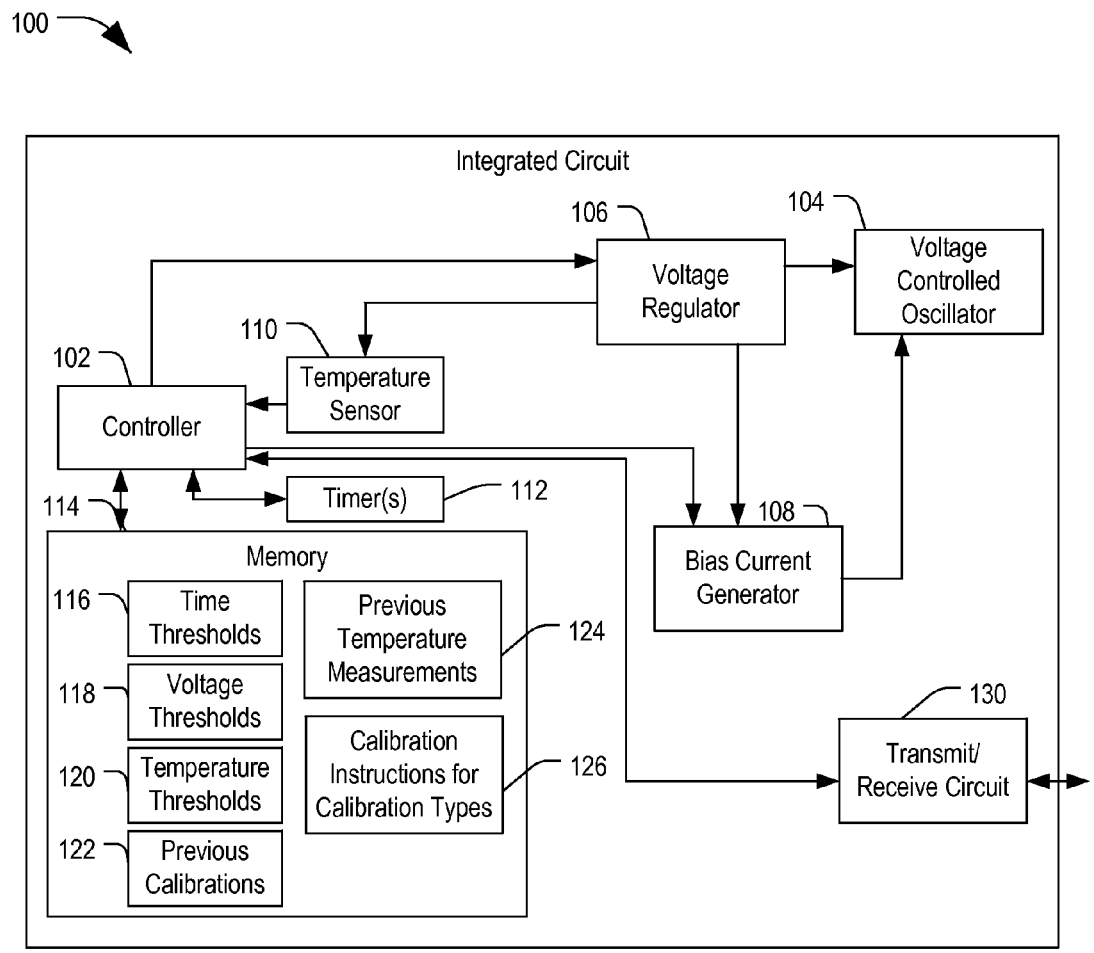
FIG. 1 is a block diagram of a circuit configured to perform background temperature calibration according to an embodiment.

Embodiments of a circuit are described below that provide temperature dependent calibrations without disrupting circuit functionality, such as transmitter or receiver functionality. In an example, the circuit determines a circuit temperature and then determines whether and what type of calibration to perform based on one of the size of the temperature change since the last calibration or the amount of time that has transpired since the last calibration. In an embodiment, the circuit also determines an active mode state (such as a transmit/receive state) of the circuit and dynamically delays or schedules performance of a calibration operation for a time when the circuit is not active (such as a time when the circuit is not in an active data receiving or transmitting state).

In an embodiment, the circuit includes multiple timers that may function independently and includes multiple selectable calibration operations, which may be performed independently and in the background (relative to a "foreground" operation, such as a transmit operation or a receive operation). The circuit may be configured to perform a calibration of a first type to calibrate a bias current generator when a first timer expires. The circuit may be configured to perform a calibration of a second type to calibrate a voltage controlled oscillator (VCO) when a second timer expires. The circuit may be configured to perform a calibration of a third type to calibrate another circuit and/or both the bias current generator and the VCO when a third timer expires.

In another embodiment, the circuit performs a temperature measurement, determines the difference between the temperature measurement and a previous measurement for each calibration type when the type of calibration was last performed. The difference represents a temperature change since a previous calibration was performed. In one embodiment, the circuit determines temperature changes since each type of calibration operation was performed. The temperature change may be referred to as a difference between the circuit temperature and a calibration temperature (i.e., the circuit temperature when a particular calibration was performed). The circuit then compares the differences to one or more thresholds to determine whether to perform a calibration and, if so, what type of calibration to perform. In an example, if a first difference between the circuit temperature and a first calibration temperature associated with a first calibration type is greater than a first threshold or if a second difference between the temperature and a second calibration temperature associated with a second calibration type is less than a second threshold, the circuit temperature is within a first temperature range, and the circuit performs a first type of calibration. If the second difference is more than the second threshold and a third difference between the temperature and a third calibration temperature associated with a third calibration type is less than a third threshold, the circuit temperature is within a second temperature range, and the circuit performs a second calibration type. If the third difference is greater than 100° C., the circuit temperature is within a third temperature range, and the circuit performs a third calibration type. One possible example of a circuit configured to perform background temperature calibrations is described below with respect to FIG. 1.

FIG. 1 is a block diagram of a circuit 100 configured to perform background temperature calibration according to an embodiment. As used herein, the term "background temperature calibration" refers to performance of the calibration operation during periods when the circuit as a whole or selected components of the circuit 100 are not active. In one example, background temperature calibration may refer to performance of one or more calibration operations when a transceiver of circuit 100 is not actively transmitting or actively receiving a signal.

Circuit 100 includes a controller 102 coupled to a temperature sensor 110, one or more timers 112, and a memory 114. Further, circuit 100 includes a voltage regulator 106 coupled to controller 102 and to a voltage controlled oscillator (VCO) 104. Circuit 100 also includes a bias current generator 108 coupled to controller 102, voltage regulator 106, and VCO 104.

Memory 114 is configured to store data and to store processor-readable instructions. Controller 102 may be a processor or microcontroller circuit (MCU) that may execute instructions stored in memory 114. Memory 114 stores time thresholds 116, voltage thresholds 118, temperature thresholds 120, and previous calibration data 122. Further, memory 114 stores previous temperature measurement data 124. Memory 114 may also store calibration instructions for multiple calibration types 126 that, when executed by controller 102, cause controller 102 to selectively perform one or more types of calibrations as background operations. In an embodiment, controller 102 may dynamically schedule performance of the selected types of calibration operations for times when the circuit is not active.

Circuit 100 may further include a transmit/receive circuit 130 that is configured to transmit and/or receive data through an antenna (not shown). In an embodiment, transmit/receive circuit 130 may include a receiver including a detector capable of determining the validity of the input data. In an example, the validity of the input data may be determined based on a number of correctly detected preamble bits or sync bits (when the number of bits exceeds a threshold) or based on a network or device identifier embedded within a received packet. In an embodiment, transmit/receive circuit 130 may include a receiver, a transmitter, or both (i.e., a transceiver). Transmit/receive circuit 130 may be coupled to VCO 104 and to controller 102. In an embodiment, controller 102 may determine a transmit/receive state associated with circuit 100, for example, based on a signal from transmit/receive circuit 130 and may delay a calibration operation for circuit 100 to avoid performing the calibration while the transmit/receive circuit 130 is either sending or receiving data.

In an embodiment, controller 102 may receive a temperature signal corresponding to a circuit temperature from temperature sensor 112. In response to the temperature signal, controller 102 determines whether to perform a calibration operation and what type of calibration to perform. In an example, controller may determine differences between the circuit temperature and one or more calibration temperatures (which were captured when a previous calibration operation was performed). The differences may be compared to one or more thresholds to determine whether and what type of calibration to perform. Further, controller 102 may optionally determine when to perform the calibration operation, such as when the circuit is not transmitting or receiving.

In an embodiment, controller 102 may determine whether and what type of calibration to perform based on a difference between the temperature measurement and the temperature at the time of a last calibration of a particular type. In another embodiment, controller 102 may determine when to perform a calibration based on the difference. In another embodiment, controller 102 may delay a calibration operation until a transmit or receive operation is completed. Alternatively, controller may delay the calibration operation (dynamically schedule performance of the calibration operation) for a time when the circuit or a component of the circuit is not active.

In an embodiment, memory 114 stores one or more temperature thresholds 120. Controller 102 may receive a temperature measurement signal from temperature sensor 110, may subtract the temperature measurement from previous temperature measurements corresponding to previous calibration operations, and may select one of the sets of calibration instructions 126 (based on the differences) for execution in order to calibrate a circuit component, such as VCO 104, bias current generator 108, another circuit element, or any combination thereof. Alternatively, controller 102 may compare one or more timer values to one or more time thresholds to determine whether and what type of calibration to perform. In an example, each timer may correspond to a particular type of calibration, and may be reset after controller 102 performs the calibration. In this alternative example, the calibration may be selected and performed based on timer expiration without consideration of whether or not the temperature difference exceeds the threshold.

While the illustrated example of FIG. 1 depicts a simplified example of a circuit 100 configured to provide a background calibration, it should be appreciated that the background calibration functionality may be incorporated in a variety of circuits, including garage door openers, remote keyless entry systems, home automation and security systems, wireless remote controls, and other transmitter/receiver devices. The calibration operation may be used to calibrate timing circuits, analog-to-digital converters (ADCs), digital-to-analog converters (DACs), driver circuitry, oscillators, other circuits, or any combination thereof. One example of a radio frequency transmitter circuit that includes background calibration functionality is described below with respect to FIG. 2.

Figure 2:
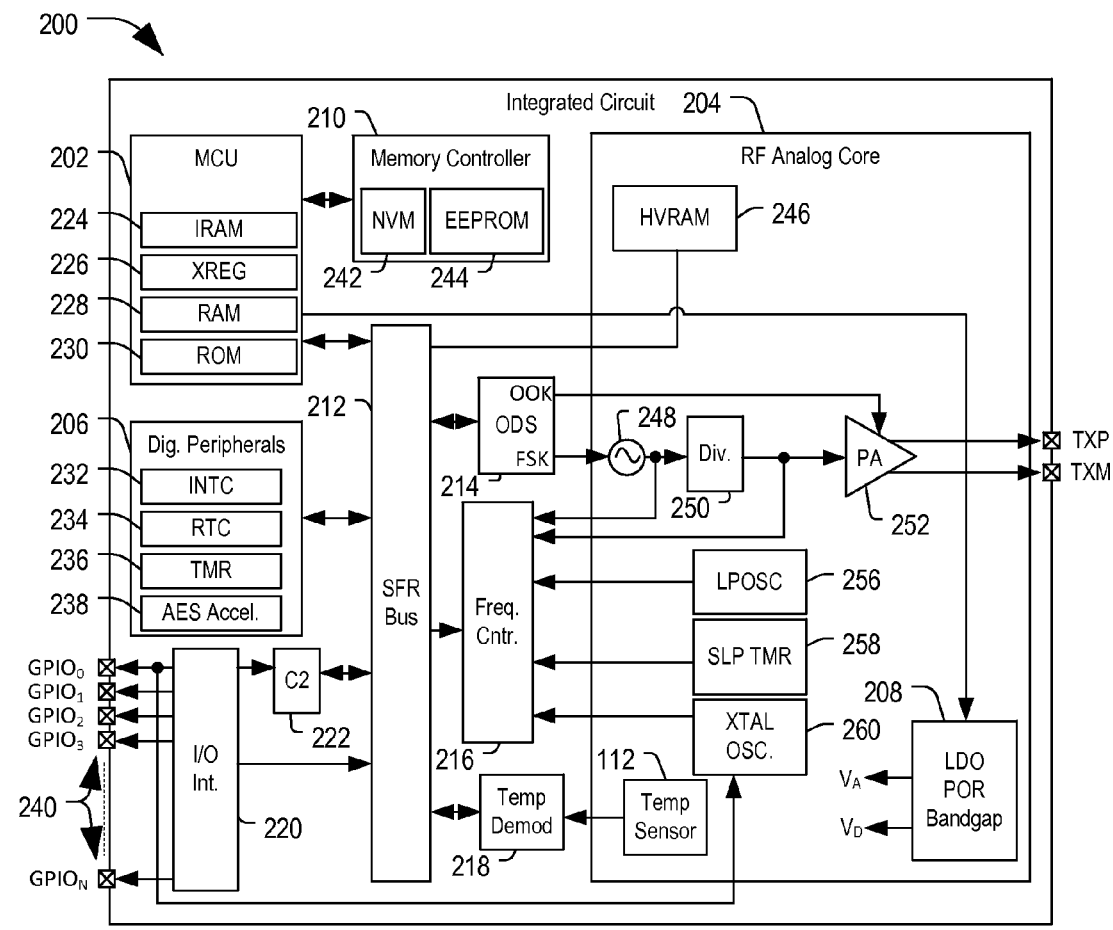
FIG. 2 is a block diagram of a circuit configured to perform background temperature calibration according to a second embodiment.

FIG. 2 is a block diagram of a circuit 200 configured to perform background temperature calibration according to a second embodiment. Circuit 200 includes a micro-controller unit (MCU) 202 coupled to a radio frequency (RF) analog core 204 and to a memory 210. In an embodiment, MCU 202 may be configured to execute instructions stored in memory 210 to control operation of circuit 200. MCU 202, in conjunction with instructions stored in memory 210, operates as a controller, such as controller 102 in FIG. 1. MCU 202 is also coupled to digital peripherals 206, an output data serializer (ODS) 214, a frequency counter 216, a temperature demodulator 218, an input/output (I/O) interface 220, and a debug and programming interface (labeled "C2") through a special function registers bus 212. I/O interface 220 may be coupled to one or more general purpose I/O pads 240 and to a crystal oscillator (labeled "XTAL OSC") 260 within RF analog core 204.

MCU 202 includes an intelligent random access memory (IRAM) 224, an on-chip register (labeled "XREG") 226, RAM 228, and a read-only memory (ROM) 230. Memory 210 includes a non-volatile memory (labeled "NVM") 242 and an electrically-erasable programmable read-only memory (EEPROM) 244. User software, stored in NVM 242, may be executed by MCU 202 to control operation of and interaction with peripherals, and may cause MCU 202 to individually shut down any or all peripherals for power savings.

Digital peripherals 206 include an interrupt configuration (INTC) 232, a real-time clock (RTC) 234, a timer (TMR) 236, and an advanced encryption standard (AES) hardware accelerator 238. RF analog core 204 includes a high voltage RAM (HVRAM) 246 coupled to SFR bus 212. RF analog core 204 further includes a local oscillator 248 including inputs coupled to frequency counter 216 and to ODS 214, and an output coupled to a clock divider 250, which has an output coupled to a power amplifier (PA) 252. PA 252 has two outputs including a first output coupled to a transmit-plus pin or pad and a second output coupled to a transmit-minus pin or pad to provide a differential output signal to an antenna for transmission. RF analog core 204 further includes a low power oscillator 256, a sleep timer 258, and XTAL OSC 260. RF analog core 204 also includes a temperature sensor 112 coupled to SFR bus 212 through temperature demodulator 218.

RF analog core 204 includes a low dropout regulator (LDO) 208 including a power on reset and a bandgap reference to provide internal analog and digital supplies, VA and VD, respectively. The power-on reset (POR) circuit monitors the power applied to circuit 200 and generates a reset signal to set circuit 200 into a known state on power-on. The bandgap produces voltage and current references for the analog blocks in circuit 200 and can be shut down when the analog blocks are not used. In an embodiment, LDO 208 may be coupled to MCU 202 and may be responsive to control signals from the MCU 202 and/or to control bits stored in a power register to adjust at least one of a reference voltage and a reference current in response to at least one of the control signals and the control bits.

The on-chip temperature sensor 112 measures the internal temperature of circuit 200, and temperature demodulator 218 converts the sensor output into a binary number representing temperature. The binary number may be used by MCU 202 to compensate the frequency of the local oscillator when the temperature changes based on the devices' frequency response versus temperature calibration.

In an embodiment, MCU 202 receives temperature data from temperature sensor 112 through temperature demodulator 218 and SFR bus 212. MCU 202 may determine how much the temperature has changed since a previous calibration was performed. In an example, when the temperature changes by more than a first threshold (such as, for example, 20° C.) since the bias current generator 108 was last calibrated, MCU 202 may execute a first type of calibration operation. In an embodiment, the first type of calibration may include a bias calibration. When the temperature changes by more than a second threshold (such as, for example, 60° C.) since the VCO 104 was last calibrated, MCU 202 may execute a second type of calibration operation. The second type of calibration may include the bias calibration and/or a VCO calibration. When the temperature changes by more than a third threshold (e.g., 100° C.), MCU 202 may execute a third type of calibration operation. The third type of calibration may include the bias calibration, the VCO calibration, and one or more other calibrations.

In another embodiment, MCU 202 may be configured to perform a selected type of calibration periodically. In an example, MCU 202 may execute a first calibration type (based on a first set of calibration instructions) when a first timer expires, a second calibration type (based on a second set of calibration instructions) when a second timer expires, and a third calibration type (based on a third set of calibration instructions) when a third timer expires. Alternatively, MCU 202 may be configured to perform one or more calibration operations when the temperature of the circuit exceeds a predetermined temperature.

In an example, MCU 202 may periodically poll the circuit temperature or may retrieve the circuit temperature in response to an event, such as a button press event. MCU 202 may determine what type of calibration operation to perform and may determine the active mode state of the circuit, such as whether the circuit is actively transmitting or receiving. MCU 202 may schedule the calibration to be performed when the circuit is inactive.

Figure 3:
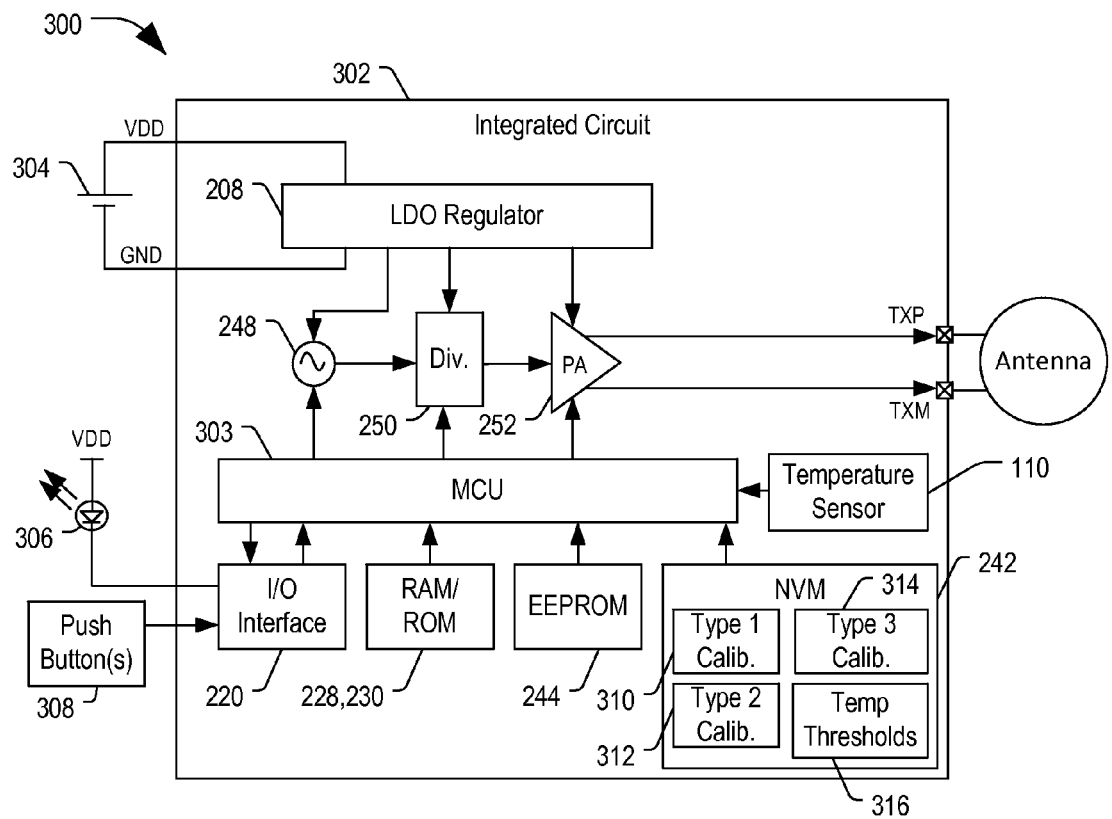
FIG. 3 is a block diagram of a circuit configured to perform background temperature calibration according to a third embodiment.

FIG. 3 is a block diagram of an apparatus 300 configured to perform background temperature calibration according to a third embodiment. Apparatus 300 includes an integrated circuit 302 coupled to a power source 304, such as a coin battery or other small profile battery. Further, apparatus 300 includes light emitting diode 306 and one or more push buttons 308, which are coupled to circuit 302. Further, circuit 302 is coupled to an antenna, such as a loop antenna. In an embodiment, apparatus 300 may be a remote control transmitter, such as a garage door opener remote control device.

Circuit 302 includes LDO regulator 208, which is coupled to local oscillator 248, divider circuit 250, and PA 252. Circuit 302 further includes MCU 303, which is one possible implementation of MCU 202 in FIG. 2. MCU 303 is coupled to local oscillator 248, clock divider 250, and PA 252. Further, MCU 303 may be coupled to I/O interface 220, which may be coupled to light-emitting diode 306 and to the one or more push buttons 308. MCU 303 may be coupled to a temperature sensor 110. In an example, temperature sensor 110 may be coupled to MCU 303 indirectly through a temperature demodulator, such as temperature demodulator 218 in FIG. 2. Additionally, MCU 303 may be coupled to RAM/ROM 228/238, NVM 242 and EEPRROM 244. In the illustrated example, NVM 242 may include calibration instructions for a Type 1 Calibration 310, a Type 2 Calibration 312, and a Type 3 Calibration 314. Further, NVM 242 may store one or more temperature thresholds 316, which may be used to determine whether to recalibrate circuit 302 and/or which type of calibration to perform.

In an embodiment, MCU 303 may receive a temperature measurement, determine a change in temperature since the last Type 1, Type 2, and Type 3 calibrations, and may perform a selected type of calibration based on the change. In another embodiment, if the change in temperature is greater than a predetermined threshold, MCU 303 may perform a selected type of calibration. In another embodiment, MCU 303 may perform a selected type of calibration based on expiration of one or more timers representing a time since the associated type of calibration was last performed. In some embodiments, MCU 303 may also delay the calibration operation based on an active mode state of the circuit 300. One possible example of a method of whether and what type of calibration operation to perform is described below with respect to FIG. 4.

Figure 4:
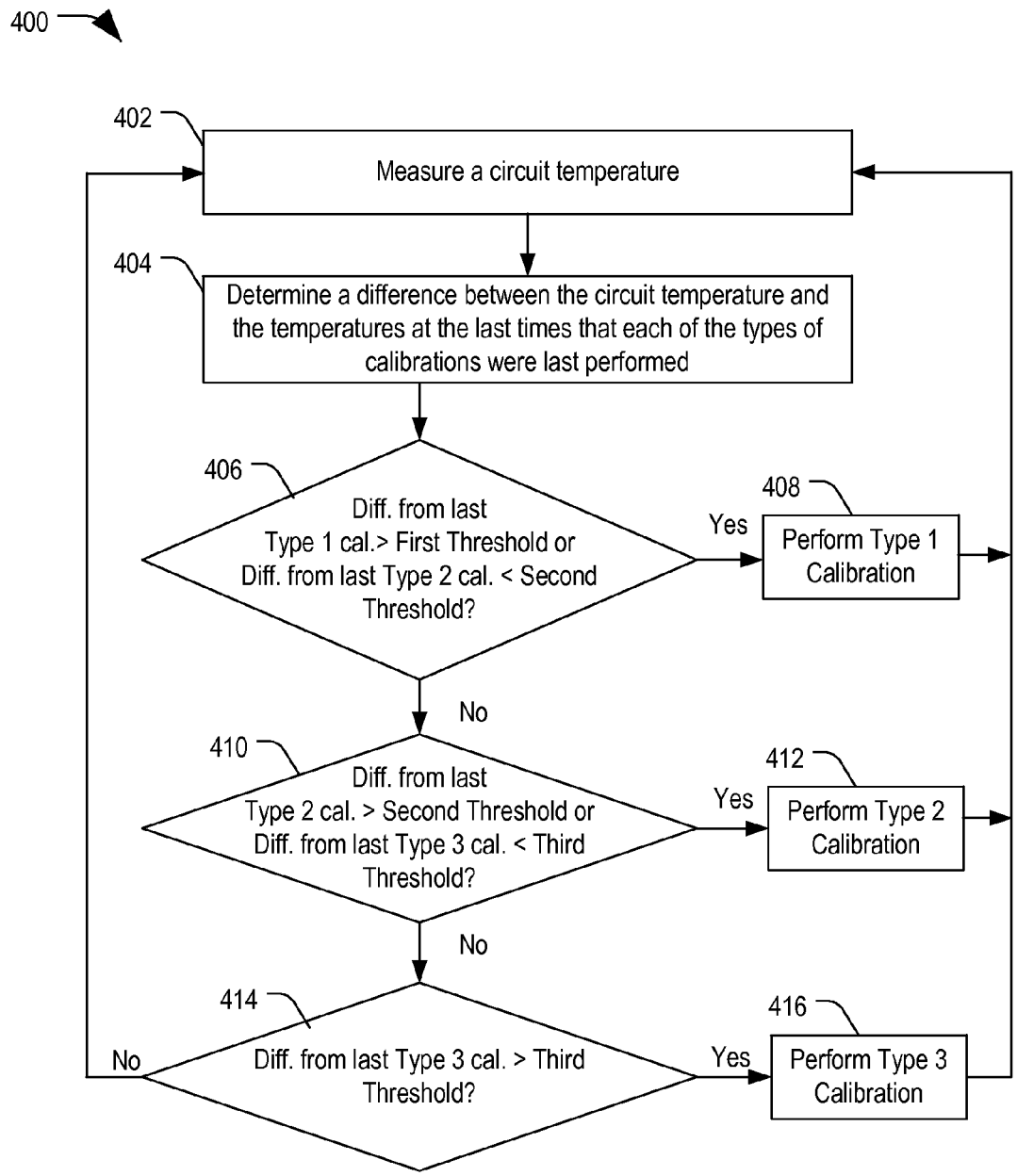
FIG. 4 is a flow diagram of a method of background temperature calibration based on changes in temperature according to an embodiment.

FIG. 4 is a flow diagram of a method 400 of background temperature calibration based on changes in temperature according to an embodiment. At 402, the circuit temperature is measured. In an embodiment, MCU 303 receives the temperature measurement from temperature sensor 112. Advancing to 404, MCU 303 may then determine a difference between the circuit temperature and the temperatures at the last times that each of the types of calibrations was last performed. For example, if the MCU 303 is configured to perform three types of calibrations, then three differences may be determined, one for each type of calibration.

Continuing to 406, if the difference between the circuit temperature and a temperature of a last Type 1 calibration is greater than a first threshold or the difference between the circuit temperature and the temperature of a last Type 2 calibration is less than a second threshold, the method 400 advances to 408 and MCU 303 performs a Type 1 calibration before returning to 402 to measure the circuit temperature again. In an embodiment, a first threshold may be 20° C. and a second threshold may be 60° C. If, at 406, the difference between the circuit temperature and the temperature of the last Type 1 calibration is not greater than the first threshold or the difference between the circuit temperature and the temperature of the last Type 2 calibration is not less than the second threshold, the method 400 advances to 410.

At 410, if the difference between the circuit temperature and the temperature of the last Type 2 calibration is greater than the second threshold or the difference between the circuit temperature and the temperature of the last Type 3 calibration is less than a third threshold, method 400 advances to 412 and MCU 303 performs a Type 2 calibration operation before returning to 402 to measure the circuit temperature again. In an embodiment, the third threshold may be 100° C. If, at 410, the differences are not between the second and third thresholds, method 400 advances to 414. At 414, MCU 303 determines if the difference between the circuit temperature and the temperature at the time of a last Type 3 calibration is greater than the third threshold. If so, method 400 advances to 416 and MCU 303 performs a Type 3 calibration and then returns to 402 to measure the temperature again. Otherwise, at 414, if the difference is less than the third threshold, method 400 returns to 402 to measure the temperature again.

In an embodiment, the first calibration type may include adjusting a bias circuit, such as adjusting one or more voltages or currents, configuring a switch network, or otherwise adjusting a circuit to compensate for performance variation due to temperature. The second calibration type may include adjusting timing of a voltage controlled oscillator to compensate for performance variation due to temperature. The third calibration type may include adjusting another circuit parameter to compensate for temperature-based performance variation.

In an example, performance of the various calibrations at 408, 412, and 416 may be delayed so as to avoid interruption of various circuit operations. In one example, the selected calibration may be scheduled to avoid interruption of a transmit or receive operation. Thus, the calibration may be performed in the background as opposed to calibration being performed as a foreground operation that interrupts or delays other circuit operations.

In the illustrated example of FIG. 4, MCU 303 may control which type of calibration to perform based on the difference between the circuit temperature and the circuit temperature at the last calibration operation for each calibration type. Thus, MCU 303 uses the circuit temperature to determine whether to perform a calibration operation and/or which type of calibration operation to perform.

While the above-described method 400 uses temperature to determine whether and when to perform a calibration operation. It is also possible to perform each type of calibration periodically. One possible example of a method of performing periodic calibrations of different types is described below with respect to FIG. 5.

Figure 5:
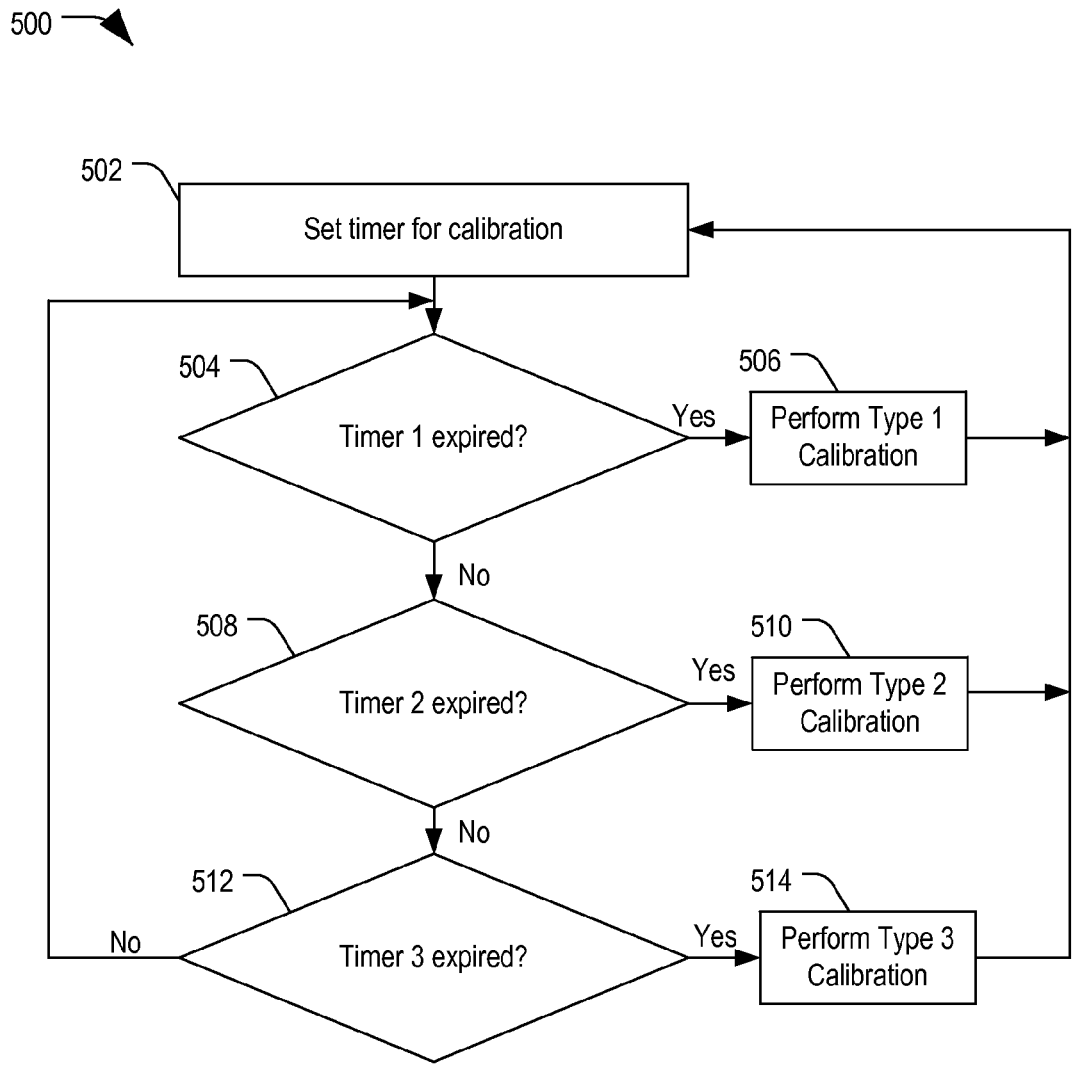
FIG. 5 is a flow diagram of a method of background temperature calibration based on timers according to an embodiment.

FIG. 5 is a flow diagram of a method 500 of background temperature calibration based on timers according to an embodiment. At 502, MCU 303 sets a timer for calibration. Circuit 300 may include multiple timers, one for each type of calibration, and MCU 303 may be configured to initialize all of the timers on power-up and subsequently to reset individual timers after a particular type of calibration is performed.

Advancing to 504, if a first timer (Timer 1) is expired, method 500 continues to 506 and MCU 303 performs a Type 1 calibration before returning to 502 to reset the first timer. In an example, the first timer may represent a time since the last Type 1 calibration was performed. If at 504, the first timer is not expired, method 500 advances to 508 to determine if the second timer (Timer 2) is expired. If the second timer is expired, method 500 advances to 510, and MCU 303 performs a Type 2 calibration before returning to 502 to reset the second timer. If, at 508, the second timer has not expired, method 500 advances to 512 to determine if the third timer (Timer 3) is expired. If the third timer is expired, method 500 continues to 514 and MCU 303 performs a Type 3 calibration before returning to 502 to reset the third timer. Otherwise, at 512, if the third timer is not expired, method 500 returns to 504 to determine if the first timer is expired.

In each instance, method 500 may also include determining a transmission/reception state or some other state of the circuit prior to performing the selected calibration operation to prevent the calibration from interrupting another circuit operation. One possible example of a method of scheduling the calibration for a time when the circuit is not transmitting or receiving is described below with respect to FIG. 6.

Figure 6:
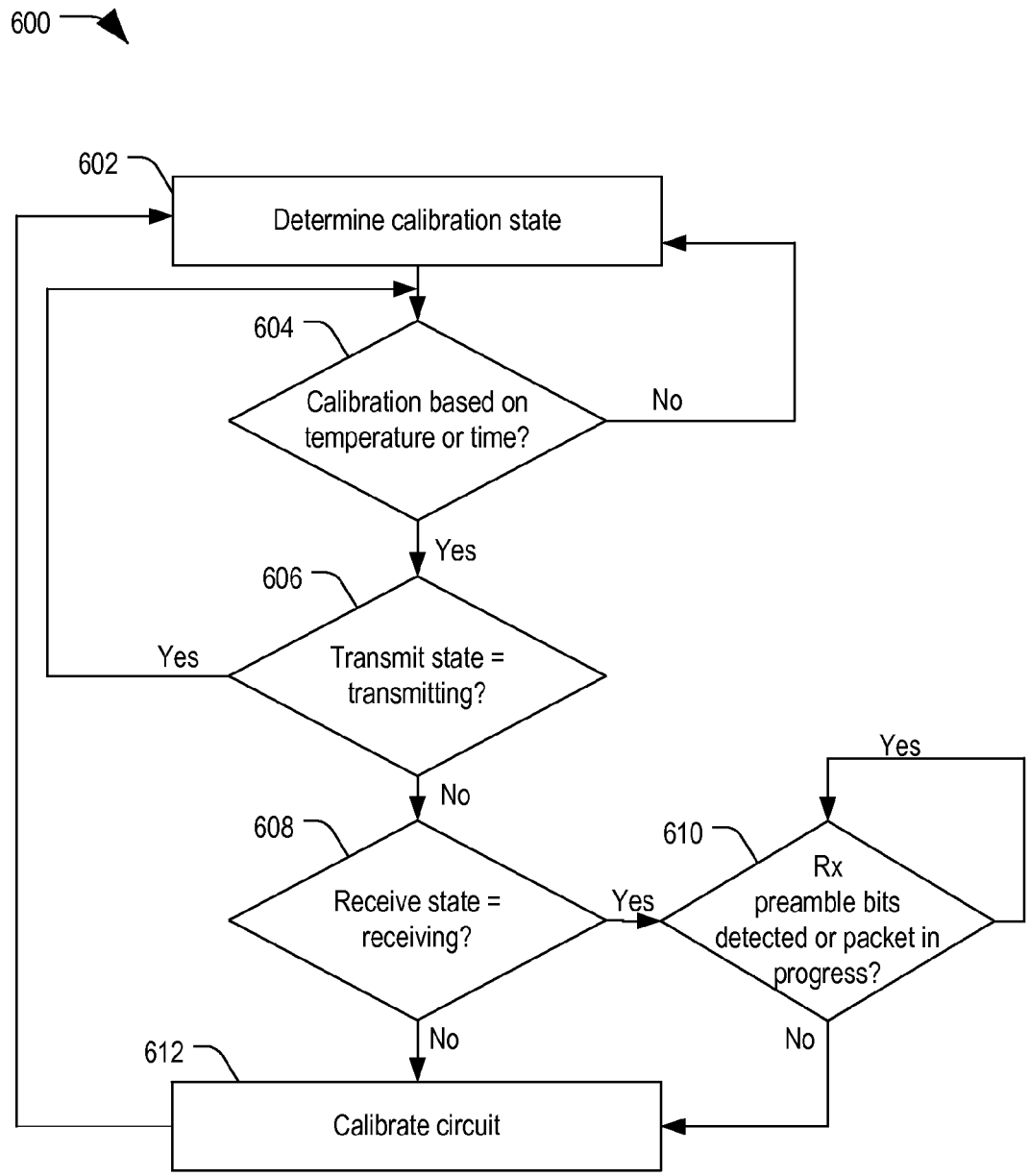
FIG. 6 is a flow diagram of a method of background temperature calibration according to an embodiment.

FIG. 6 is a flow diagram of a method 600 of background temperature calibration according to an embodiment. Advancing to 602, a calibration state is determined. In an example, the MCU 303 determines whether a calibration should be run and, if so, what type of calibration. The determination may be based on expiration of a timer and/or a change in the circuit temperature.

Proceeding to 604, if no calibration is needed, method 600 returns to 602 and the calibration is state is determined. Otherwise, at 604, if a calibration should be performed based on temperature or time, method 600 continues to 606 and MCU 303 determines if a transmit state of the circuit indicates that the circuit is transmitting. If the circuit is transmitting, method 600 returns to 604 to determine if a calibration should be performed. In an example, the MCU 303 may stall the calibration operation until the transmission is over. If, at 606, the circuit is not transmitting, method 600 advances to 608 to determine if a receive state of the circuit indicates that the circuit is receiving. If not, method 600 advances to 612 and MCU 303 calibrates the circuit before returning to 602.

However, if at 608 the circuit is receiving, method 600 advances to 610 and the MCU 303 determines if preamble bits are detected or if packet reception is in progress. Detection of preamble bits represents one possible method to indicate the reception of a valid packet, i.e., active reception of a packet. By checking a detector for pre-amble bits, the transceiver (or MCU 303) can determine if a valid packet is currently in progress. Additionally, other indicators of a packet may include detection of a sync word (a special synchronization string of data) or other identifiers for a valid packet such as MAC (Media Access Control) address, IP (Internet Protocol) address or any type of network or device address. If so, method 600 holds at 610 until no preamble bits or no packets are detected or a packet in progress has been completed. At 610, if there are no preamble bits detected or no packet in progress, method 600 proceeds to 612 and MCU 303 calibrates the circuit.

In the above-discussion of FIGS. 4-6, some of the methods were described with respect to MCU 303. It should be appreciated that such operations may be performed using controller 102 in FIG. 1 or MCU 202 in FIG. 2, depending on the implementation. Further, the arrangement of the blocks in methods 400, 500 and 600 in FIGS. 4, 5, and 6 may be altered without deviating from the spirit of the disclosure. For example, in FIG. 6, the receive state (block 608) may be determined before the transmit state (block 606).

In accordance with various embodiments, the methods described herein may be implemented as one or more processor-readable instruction sets executing on a processor, microcontroller unit (MCU), field programmable gate array (FPGA), or other circuit. In accordance with another embodiment, the methods described herein may be implemented as one or more user-programs running on an electronic device, such as a garage door opener, a remote control, or other transmitting or receiving device. Dedicated hardware implementations including, but not limited to, application specific integrated circuits, programmable logic arrays, and other hardware devices can likewise be constructed to implement the methods described herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A circuit comprises: a timer coupled to a controller; and the controller configured to determine a calibration state of the circuit, to determine an active mode state of the circuit, to select a type of calibration operation based on the calibration state, and to control timing of the selected type of calibration operation in response to determining the calibration state to correspond to a time when the circuit is not active, the controller is configured to perform: a first type of calibration when the timer exceeds a first threshold; a second type of calibration when the timer exceeds a second threshold; and a third type of calibration when the timer exceeds a third threshold.

2. The circuit of claim 1, further including a temperature sensor coupled to the controller and configured to provide a signal representing a circuit temperature to the controller.

3. The circuit of claim 2, wherein the controller determines a calibration state of the circuit by calculating a difference between the circuit temperature and at least one previously recorded temperature corresponding to previously performed type of calibration, the controller configured to perform one or more calibration operations when the difference exceeds a threshold temperature.

4. The circuit of claim 3, wherein the controller is configured to perform:

a first type of calibration when the difference is greater than a first threshold and less than a second threshold; and a second type of calibration when the difference is greater than the second threshold and less than a third threshold.

5. The circuit of claim 1, wherein the selected type of calibration comprises at least one of a bias circuit calibration and a voltage controlled oscillator calibration.

6. The circuit of claim 1, wherein the active mode state comprises at least one of a transmitting mode state and a receiving mode state.

7. The circuit of claim 6, further comprising a receiver including a detector configured to determine validity of input data received by the receiver; and wherein a receive mode state of the circuit is determined by the detector based on the validity of the input data.

8. The circuit of claim 7, wherein the detector determines the validity of the input data when a number of correctly detected preamble bits or sync bits exceeds a threshold.

9. The circuit of claim 7, wherein the detector determines the validity of the input data based on at least one of a network identifier and a device identifier embedded within a packet.

10. A circuit comprising:

a controller configured to determine a calibration state of a circuit, to determine an active mode state of the circuit including at least one of a transmitting mode state and a receiving mode state, to select a type of calibration operation based on the calibration state, and to control timing of the selected type of calibration operation in response to determining the calibration state to correspond to a time when the circuit is not active; and a receiver including a detector configured to determine a receive mode state of the receiver based on validity of input data received by the receiver.

11. The circuit of claim 10, further including a temperature sensor coupled to the controller and configured to provide a signal representing a circuit temperature to the controller.

12. The circuit of claim 11, wherein the controller determines a calibration state of the circuit by calculating a difference between the circuit temperature and at least one previously recorded temperature corresponding to previously performed type of calibration, the controller configured to perform one or more calibration operations when the difference exceeds a threshold temperature.

13. The circuit of claim 12, wherein the controller is configured to perform:

a first type of calibration when the difference is greater than a first threshold and less than a second threshold; and a second type of calibration when the difference is greater than the second threshold and less than a third threshold.

14. The circuit of claim 10, wherein the selected type of calibration comprises at least one of a bias circuit calibration and a voltage controlled oscillator calibration.

15. The circuit of claim 10, further comprising:

a timer coupled to the controller; and wherein the controller is configured to perform:

a first type of calibration when the timer exceeds a first threshold;

a second type of calibration when the timer exceeds a second threshold; and a third type of calibration when the timer exceeds a third threshold.

16. The circuit of claim 10, wherein the detector determines the validity of the input data when a number of correctly detected preamble bits or sync bits exceeds a threshold.

17. The circuit of claim 10, wherein the detector determines the validity of the input data based on at least one of a network identifier and a device identifier embedded within a packet.

18. A circuit comprising:
a timer coupled to the controller; and
a controller configured to determine a calibration state of a circuit, to determine an active mode state of the circuit including at least one of a transmitting mode state and a receiving mode state, to select a type of calibration operation based on the calibration state, and to control timing of the selected type of calibration operation in response to determining the calibration state to correspond to a time when the circuit is not active, the controller is configured to perform:
 a first type of calibration when the timer exceeds a first threshold;
 a second type of calibration when the timer exceeds a second threshold; and
 a third type of calibration when the timer exceeds a third threshold.

19. The circuit of claim 18, further comprising a receiver including a detector configured to determine validity of input data received by the receiver; and wherein a receive mode state of the circuit is determined by the detector based on the validity of the input data;
wherein the detector determines the validity of the input data based on at least one of:
 when a number of correctly detected preamble bits or sync bits exceeds a threshold; and
 at least one of a network identifier and a device identifier embedded within a packet.

20. The circuit of claim 18, further comprising:
a temperature sensor coupled to the controller and configured to provide a signal representing a circuit temperature to the controller; and
wherein the controller:
 determines a calibration state of the circuit by calculating a difference between the circuit temperature and at least one previously recorded temperature corresponding to previously performed type of calibration, the controller configured to perform one or more calibration operations when the difference exceeds a threshold temperature;
 performs a first type of calibration when the difference is greater than a first threshold and less than a second threshold; and
 performs a second type of calibration when the difference is greater than the second threshold and less than a third threshold.

\* \* \* \* \*